(No Model.)
F. H. LANE.
CLAMP FOR STRETCHING OR TENTERING CLOTH, &c.
No. 361,014. Patented Apr. 12, 1887.
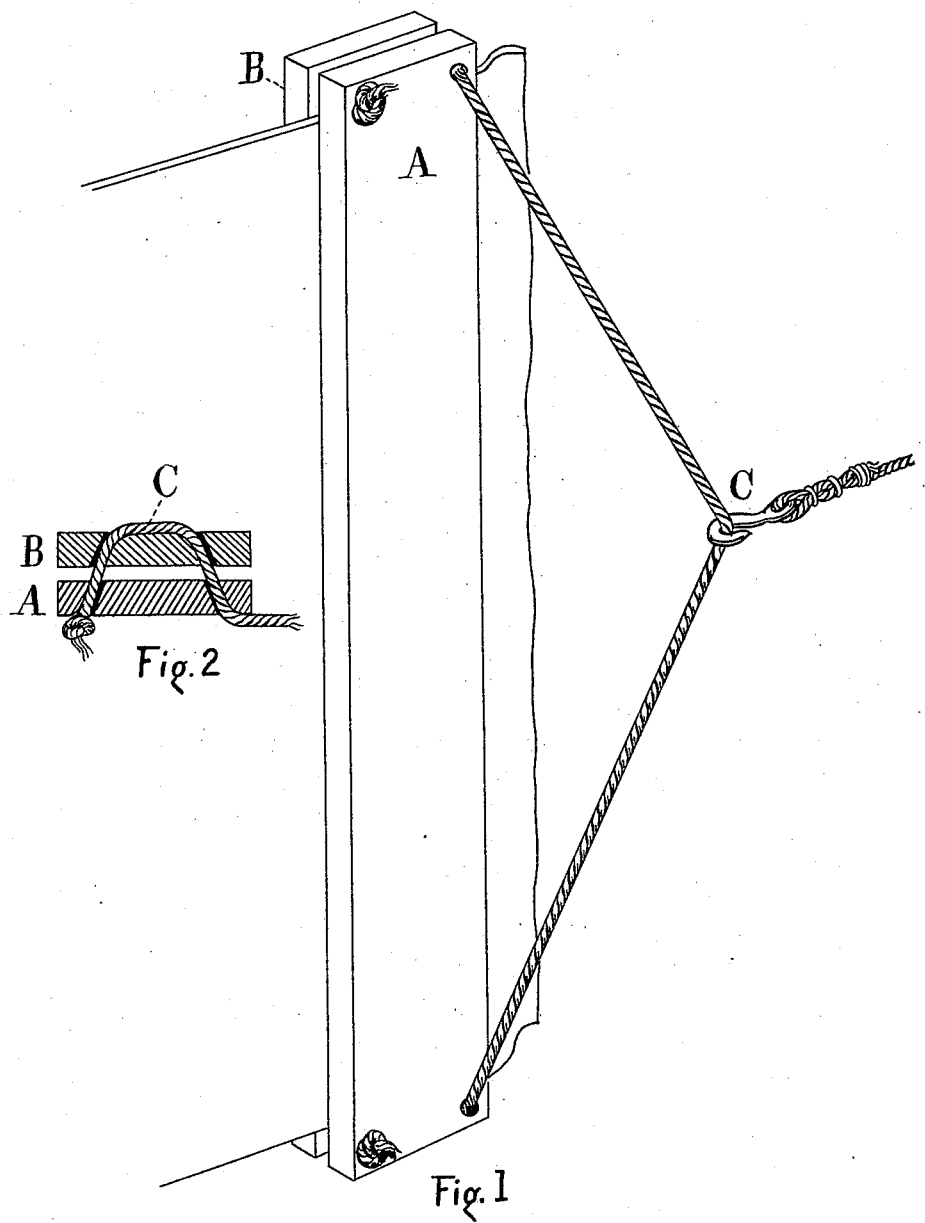
WITNESSES:
INVENTOR

UNITED STATES PATENT OFFICE.

FRED. H. LANE, OF CLEVELAND, OHIO.

CLAMP FOR STRETCHING OR TENTERING CLOTH, &c.

SPECIFICATION forming part of Letters Patent No. 361,014, dated April 12, 1887.

Application filed July 17, 1886. Serial No. 208,312. (No model.)

*To all whom it may concern:*

Be it known that I, FRED. H. LANE, a citizen of the United States, residing at Cleveland, in the county of Cuyahoga and State of Ohio, have invented a new and useful Device for a Clamp for Stretching or Tentering Cloth or other Fabric, of which the following is a specification.

This clamp consists, essentially, of two jaws, of wood or metal, with two holes bored in each end of each jaw and strung together on a cord knotted at both ends in the manner shown in the accompanying drawings, in which—

Figure 1 represents the clamp adjusted to the end of a piece of cloth and the cord drawn taut, while Fig. 2 represents a cross-section through the holes at one end of the clamp, showing exactly how the jaws are strung together. Both ends are strung symmetrically.

The jaw A is a rectangular piece of wood or metal with holes bored through each corner. These holes may be either perpendicular to the plane of contact of the jaw or inclined at an angle, as in Fig. 2. In practice it is found that it works well either way. The jaw B is in practice made exactly like A, when the holes are perpendicular; but if the holes are inclined in A they are also inclined in B at the same angle, but are enough nearer together so that when the two jaws A and B are together the holes in A come in line with the holes in B. The corners, shown as rounded off in Fig. 2, are not made so at first, but become so by the wearing of the cord.

The cord has no novel feature about it. In practice, braided cord is used with best results. The new feature in this device is the manner in which the jaws A and B are laced or strung together on the cord C, and this is presented with sufficient clearness to enable any one to make a clamp without any further description.

It is obvious that when the cord C is drawn taut the jaws A and B must approach each other, and the harder the cord is stretched in order to stretch the fabric, the tighter will the jaws bite together and hold the fabric.

I am aware that prior to my invention a clamp in which are two jaws similar in shape to mine has been used in a device for stretching trousers, and therefore I do not claim, broadly, the jaws by themselves as part of my invention, except as they are bored for the admission of a cord in the manner specified; but

What I claim is—

1. A clamp consisting of two parts strung together by a cord, in the manner and for the purpose set forth.

2. The part A, the part B, and the cord C in combination, in the manner and for the purpose specified.

FRED. H. LANE.

Witnesses:
CLINTON S. DAY,
L. H. FOWLER.